No. 733,672. PATENTED JULY 14, 1903.
L. NEATHAMER.
GAMBREL.
APPLICATION FILED FEB. 14, 1903.
NO MODEL.

Witnesses
E. F. Stewart
C. N. Woodward.

Lawrence Neathamer, Inventor.
by C. A. Snow & Co.
Attorneys.

THE NORRIS PETERS CO., PHOTO-LITHO., WASHINGTON, D. C.

No. 733,672. Patented July 14, 1903.

UNITED STATES PATENT OFFICE.

LAWRENCE NEATHAMER, OF HIGHLAND, ILLINOIS.

GAMBREL.

SPECIFICATION forming part of Letters Patent No. 733,672, dated July 14, 1903.

Application filed February 14, 1903. Serial No. 143,399. (No model.)

*To all whom it may concern:*

Be it known that I, LAWRENCE NEATHAMER, a citizen of the United States, residing at Highland, in the county of Madison and State of Illinois, have invented a new and useful Gambrel, of which the following is a specification.

This invention relates to devices employed by butchers and others in supporting carcasses while being dressed or while cooling and commonly known as "gambrels," and has for its object to produce a gambrel having improved means to prevent the slipping or displacement of the gambrel on its support; and the invention consists in certain novel features of the construction, as hereinafter shown and described, and specified in the claims.

Figure 1:
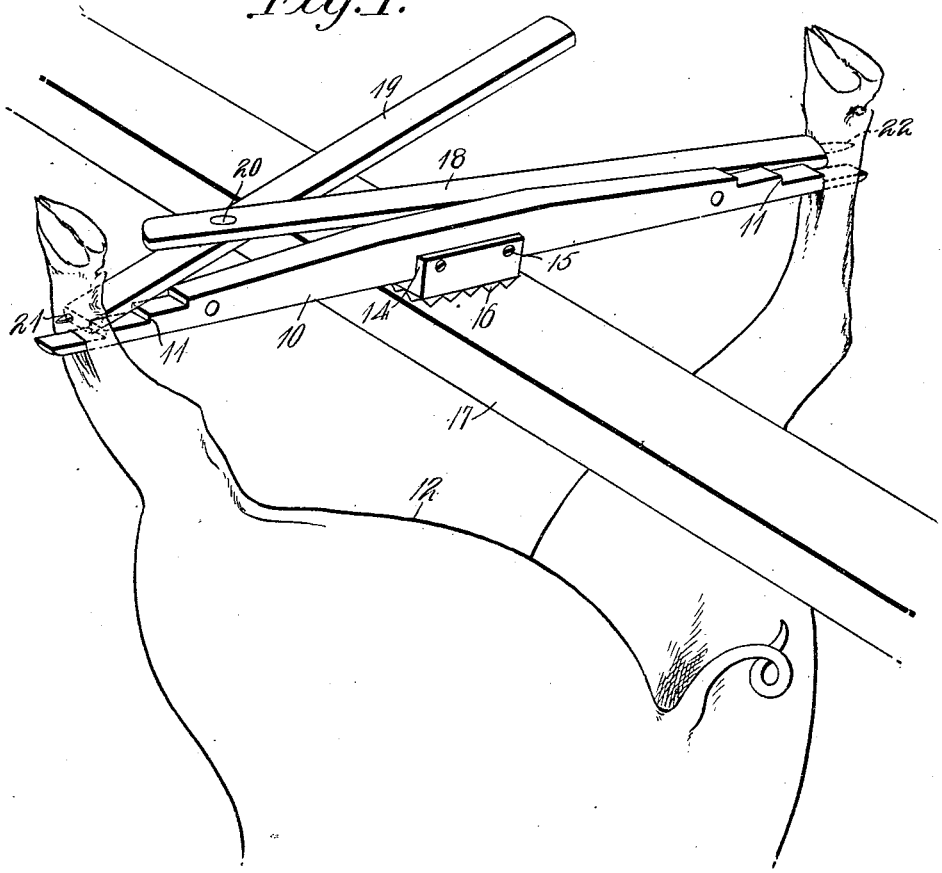
Figure 2:
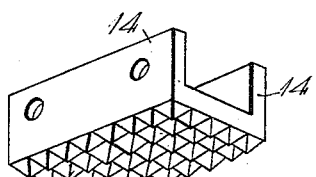

In the drawings illustrative of the invention, in which corresponding parts are designated by like denoting characters, Figure 1 is a perspective view of the device applied. Fig. 2 is an enlarged reversed perspective view of the supporting-shoe detached.

The gambrel consists of a bar 10, having spaced notches 11 at the ends adapted to support the distended legs of the slaughtered carcass, (indicated at 12.) The gambrel-bar will preferably be of wood of sufficient size and strength to support the carcasses which are suspended therefrom and will be provided centrally with a supporting-shoe 13, which rests upon the supporting means of the gambrel. The shoe is channeled, forming a socket-like structure, in which the gambrel is held, as by transverse bolts or rivets 15, the lower surface of the shoe being serrated or otherwise roughened, as indicated at 16, to prevent slipping upon the supporting means.

The supporting means for the gambrel may be in any desired form, depending upon the circumstances and the locality under which the device is employed, provided it be of wood or other material into which the serrations of the shoe may bite; but for the purpose of illustration a section of a pole 17 is shown, which preferably has a flat clip-engaging surface and will be supported by "horses," "struts," or any other suitable means; but I do not wish to be limited in any manner to the form or arrangement of the supporting means, as the operation of the device is in no wise dependent thereon, as hereinafter more fully described. The spreader herein shown for spreading the legs of the animal to receive the gambrel consists of two bars 18 19, connected pivotally, as at 20, and with spurs 21 22, extending, respectively, from their ends, adapted to engage the extended legs of the slaughtered animals and forcibly distend them.

When animals are slaughtered, it is necessary to forcibly spread the "sides" in order to properly "dress" the carcass and prepare it for use and to hold them in spread position by a gambrel, the operation being as follows: The "spreader" members are placed in the position shown in Fig. 2 with the spurs 21 22 in engagement with the inner sides of the legs of the animal and the two members brought into longitudinal alinement, this action exerting a strong toggle-lever force outwardly, which will enable the ends of the gambrel to be inserted through the usual tendon cavities. The spreader members are then separated again, as in Fig. 1, which will permit the legs of the animal to partially collapse; but the extent of the collapse will be limited by the notches 11. The carcass is then suspended from the support 17 in any desired manner. By this simple means the carcass may be very quickly and easily placed in the required position for preparing it for market and likewise in position for the free circulation of air for cooling the carcass either naturally or in refrigerators.

The device may be employed in any desired locality either by butchers in slaughterhouses, in the larger packing-houses, or by farmers or others in the occasional slaughter of animals for food.

Heretofore much difficulty and annoyance have been caused by the slipping of gambrel-bars from their supports and causing the carcasses to fall, resulting in damage thereto as well as loss of time necessary to restore them to their positions.

With the improved device the supporting-shoe 13, with its serrated or roughened lower surface 16, "bites" into the support 17 and effectually prevents lateral movement between the shoe and its supporting means, thereby obviating any tendency of the gambrel and its load to become displaced. This is a very important feature of the invention and adds materially to its value and efficiency.

The device is very simple, cheap, and easily applied and operated and will be found very useful and convenient for the purposes described.

Having thus described my invention, what I claim is—

1. The combination with a gambrel-bar of a supporting-shoe connected centrally thereto and having a serrated lower surface, adapted to bite into a gambrel-support.

2. The combination with a gambrel of a supporting channeled shoe embracing the gambrel and connected centrally thereto and provided with a serrated lower surface, for engaging a support and locking the gambrel thereto.

In testimony that I claim the foregoing as my own I have hereto affixed my signature in the presence of two witnesses.

LAWRENCE NEATHAMER.

Witnesses:
CHAS. T. RUST,
J. P. STREUBER.